(12) United States Patent
Jegannathan et al.

(10) Patent No.: US 10,824,810 B2
(45) Date of Patent: Nov. 3, 2020

(54) SYSTEM AND METHOD FOR IDENTIFYING CORRELATED OPERATOR ACTION EVENTS BASED ON TEXT ANALYTICS OF OPERATOR ACTIONS

(71) Applicant: Honeywell International Inc., Morris Plains, NJ (US)

(72) Inventors: Nadesh Kumar Jegannathan, Salem (IN); Suresh Daniel, Bengaluru (IN)

(73) Assignee: Honeywell International Inc., Morris Plains, NJ (US)

( * ) Notice: Subject to any disclaimer, the term of this patent is extended or adjusted under 35 U.S.C. 154(b) by 92 days.

(21) Appl. No.: 16/002,812

(22) Filed: Jun. 7, 2018

(65) Prior Publication Data

US 2019/0377789 A1 Dec. 12, 2019

(51) Int. Cl.
*G05B 23/02* (2006.01)
*G06F 40/295* (2020.01)
*G06F 40/30* (2020.01)
*G06F 40/253* (2020.01)
*G06F 40/284* (2020.01)

(52) U.S. Cl.
CPC .......... *G06F 40/295* (2020.01); *G06F 40/253* (2020.01); *G06F 40/284* (2020.01); *G06F 40/30* (2020.01); *G05B 23/0208* (2013.01)

(58) Field of Classification Search
CPC ................................................ G05B 23/0208
See application file for complete search history.

(56) References Cited

U.S. PATENT DOCUMENTS

| 5,768,119 A * | 6/1998 | Havekost ............. G05B 19/409 700/4 |
| 8,779,921 B1 * | 7/2014 | Curtiss ................. G08B 25/009 340/541 |
| 2010/0088302 A1 * | 4/2010 | Block ..................... H04L 51/38 707/706 |
| 2015/0066163 A1 | 3/2015 | Sunderam |
| 2015/0242182 A1 | 8/2015 | McAdam |
| 2015/0316923 A1 | 11/2015 | Strilich et al. |
| 2016/0140123 A1 * | 5/2016 | Chang ............... G06F 16/24522 707/760 |

OTHER PUBLICATIONS

Jegannathan et al., "System and Method for Automatic Logging of Events in Industrial Process Control and Automation System Using Change Point Analysis", U.S. Appl. No. 15/616,019, filed Jun. 7, 2017, 28 pages.

* cited by examiner

*Primary Examiner* — Feng-Tzer Tzeng

(57) ABSTRACT

A method includes obtaining, from an event log, first text of an alarm associated with an industrial process in a process control system, and processing the first text to obtain first key terms. The method also includes obtaining, from the event log, second text of an operator response, and processing the second text to obtain second key terms. The method further includes filtering and segmenting at least one of the first key terms and the second key terms. The method also includes performing text matching on the first key terms and the second key terms to identify a correlation between the first text and the second text. In addition, the method includes storing the first text, the second text, and the correlation between the first text and the second text in a data store.

17 Claims, 6 Drawing Sheets

SYSTEM AND METHOD FOR IDENTIFYING CORRELATED OPERATOR ACTION EVENTS BASED ON TEXT ANALYTICS OF OPERATOR ACTIONS

TECHNICAL FIELD

This disclosure relates generally to industrial process control and automation systems. More specifically, this disclosure relates to a system and method for identifying correlated operator action events based on text analytics of operator actions.

BACKGROUND

Industrial process control and automation systems are often used to automate large and complex industrial processes. These types of systems routinely include sensors, actuators, and controllers. Some of the controllers typically receive measurements from the sensors and generate control signals for the actuators. Other controllers often perform higher-level functions, such as planning, scheduling, and optimization operations.

Raw alarm and event log data of an industrial process typically contains alarm events and their correlated and non-correlated operator response events. In many cases, the alarm events and operator response events of a particular alarm or procedure are not sequentially logged, but instead are mixed with the operator response events of many other alarms or procedures. This can lead to confusion over which operator responses correspond to which alarms.

SUMMARY

This disclosure provides a system and method for identifying correlated operator action events based on text analytics of operator actions.

In a first embodiment, a method includes obtaining, from an event log, first text of an alarm associated with an industrial process in a process control system, and processing the first text to obtain first key terms. The method also includes obtaining, from the event log, second text of an operator response, and processing the second text to obtain second key terms. The method further includes filtering and segmenting at least one of the first key terms and the second key terms. The method also includes performing text matching on the first key terms and the second key terms to identify a correlation between the first text and the second text. In addition, the method includes storing the first text, the second text, and the correlation between the first text and the second text in a data store.

In a second embodiment, an apparatus includes at least one processing device configured to obtain, from an event log, first text of an alarm associated with an industrial process in a process control system, and process the first text to obtain first key terms; obtain, from the event log, second text of an operator response, and process the second text to obtain second key terms; filter and segment at least one of the first key terms and the second key terms; perform text matching on the first key terms and the second key terms to identify a correlation between the first text and the second text; and store the first text, the second text, and the correlation between the first text and the second text in a data store.

In a third embodiment, a non-transitory computer readable medium contains instructions that when executed cause at least one processing device to obtain, from an event log, first text of an alarm associated with an industrial process in a process control system, and process the first text to obtain first key terms; obtain, from the event log, second text of an operator response, and process the second text to obtain second key terms; filter and segment at least one of the first key terms and the second key terms; perform text matching on the first key terms and the second key terms to identify a correlation between the first text and the second text; and store the first text, the second text, and the correlation between the first text and the second text in a data store.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
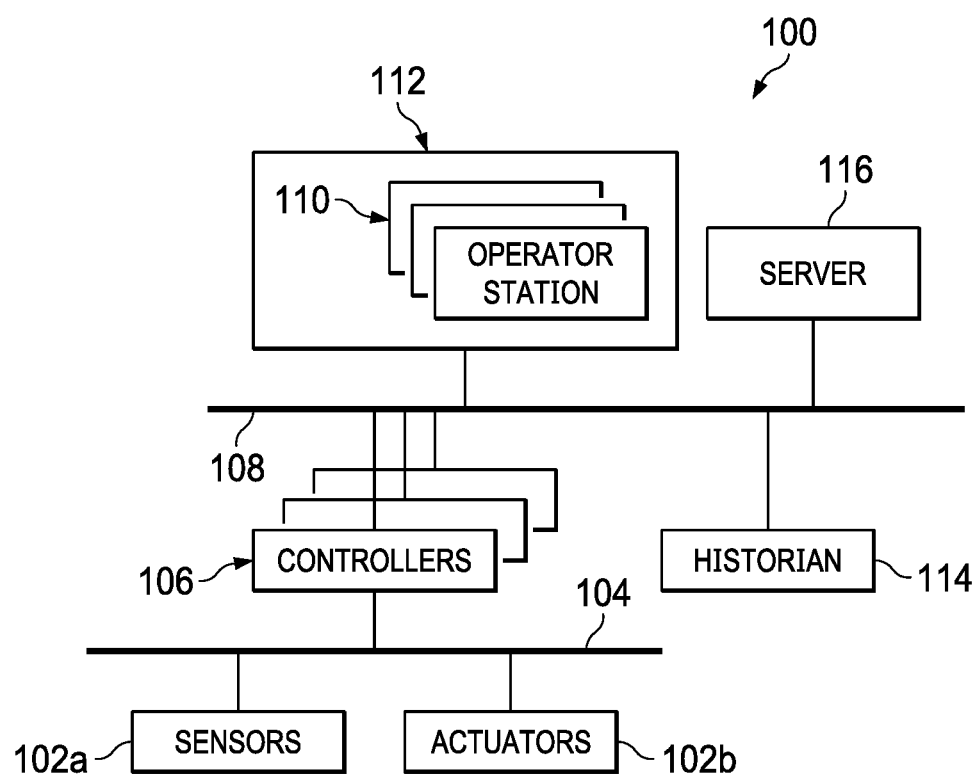
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator stations 110. Each operator station 110 could be used to provide information to an operator and receive information from an operator. For example, each operator station 110 could provide information identifying a current state of an industrial process to the operator, such as values of various process variables and alarms associated with the industrial process. Each operator station 110 could also receive information affecting how the industrial process is controlled, such as by receiving setpoints or control modes for process variables controlled by the controllers 106 or other information that alters or affects how the controllers 106 control the industrial process. Each operator station 110 includes any suitable structure for displaying information to and interacting with an operator. For example, each operator station 110 could represent a computing device running a WINDOWS operating system or other operating system.

Multiple operator stations 110 can be grouped together and used in one or more control rooms 112. Each control room 112 could include any number of operator stations 110 in any suitable arrangement. In some embodiments, multiple control rooms 112 can be used to control an industrial plant, such as when each control room 112 contains operator stations 110 used to manage a discrete part of the industrial plant.

The control and automation system 100 also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100. Each server 116 denotes a computing device that executes applications for users of the operator stations 110 or other applications. The applications could be used to support various functions for the operator stations 110, the controllers 106, or other components of the system 100. Each server 116 could represent a computing device running a WINDOWS operating system or other operating system.

During operation of the system 100, various events occur that are associated with components of the system 100. For example, sensors 102a, actuators 102b, controllers 106, and other components of the system 100 all may generate, or be associated with events. Some events are simply status-type events, while other events may be alarms associated with an undesirable or dangerous condition. Such events and alarms are logged and stored in an event log, such as in the historian 114, the server 116, or another component of the system 100. Raw alarm and event log data of industrial processes associated with the system 100 contains alarm events and its correlated and non-correlated operator response events. For example, the historian 114 may log events and the actions of one or more operators at one or more operator stations 110 in response to events. The historian 114 may also record events without corresponding operator actions and operator actions without specific corresponding events. There may be thousands of events stored in the event log over time.

It is not easy to directly correlate events and corresponding operator actions. The alarm and operator response events of a particular alarm or procedure are not sequentially logged, but instead are mixed with the operator response events of many other alarms/procedures. For example, an operator may perform multiple different actions over time in response to an event that occurred in the past. During the period between the event and the first operator action, or between the first operator action and subsequent operator actions, other events may occur and be logged, and other operator actions may be performed and logged, thereby creating a disconnect in the event log between the event in question and its corresponding operator action(s).

Thus, there is a need to identify and filter only the correlated operator action events of a particular alarm or procedure in order to analyze and understand the operator action or response patterns, an operator's adherence to recommended responses or procedures, and to derive other operational insights that help in process and operational improvement.

To address these and other issues, embodiments of this disclosure provide a solution for identifying the correlated operator response events of an alarm or procedure by matching the text contained in the event description (sometimes referred to as a "tag") of an operator action event with the text in the recommended operator response or procedures. In particular, one or more of the components in FIG.

1 (such as the operator stations 110, the historian 114, or the server 116) could be configured to use text from recommended alarm responses or procedures to identify correlated operator action events from the event descriptions by text matching. The disclosed embodiments use text analytics to identify correlated operator action events. Additional details regarding the disclosed embodiments are provided below.

Although FIG. 1 illustrates one example of an industrial process control and automation system 100, various changes may be made to FIG. 1. For example, the system 100 could include any number of sensors, actuators, controllers, networks, operator stations, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment supporting identification of correlated operator action events based on text analytics of operator actions. This functionality can be used in any other suitable system.

Figure 2:
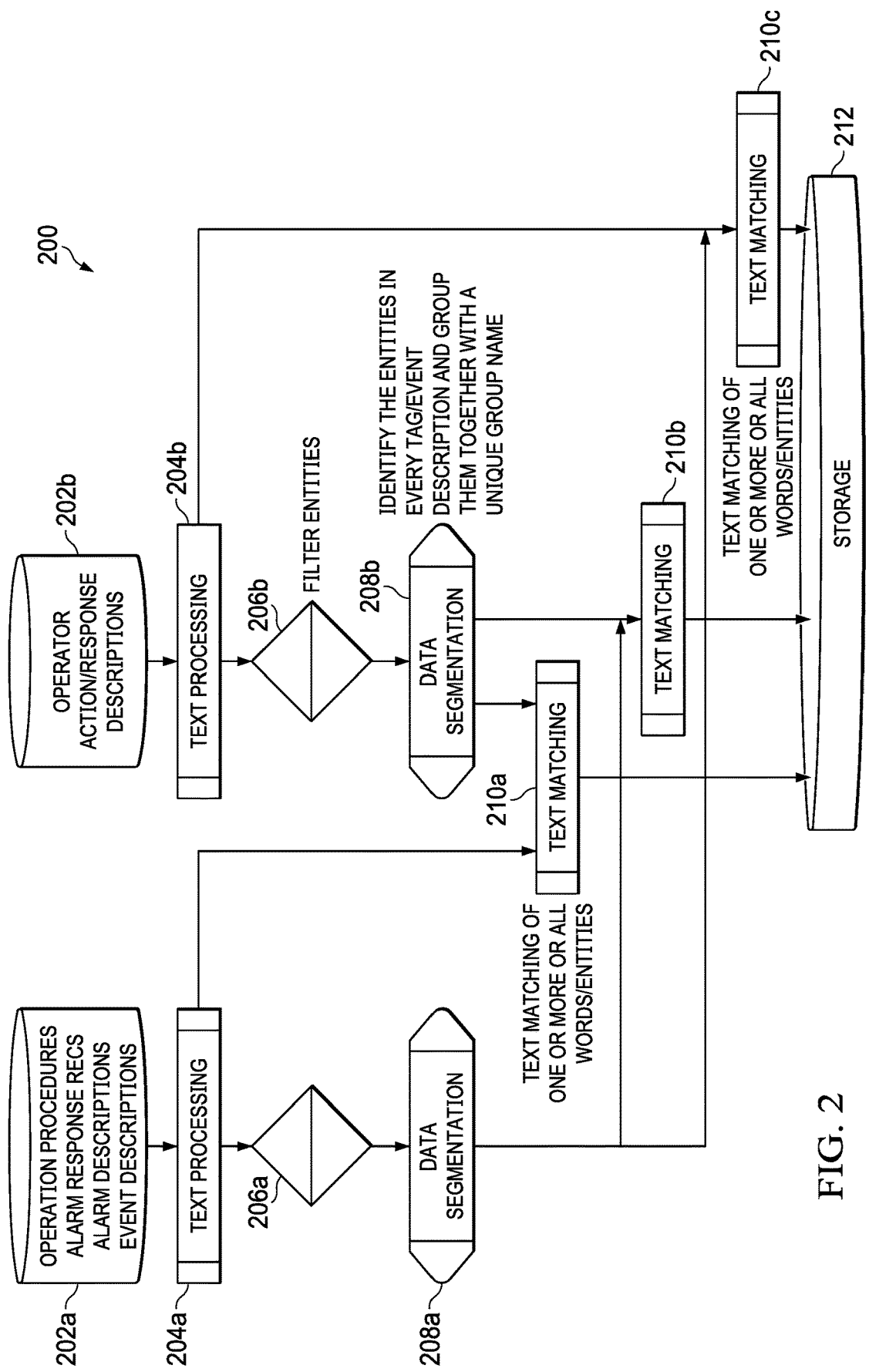
FIG. 2 illustrates a block diagram showing an example technique for identifying correlated operator action events based on text analytics of operator actions according to this disclosure.

FIG. 2 illustrates a block diagram showing an example technique 200 for identifying correlated operator action events based on text analytics of operator actions according to this disclosure. The technique 200 uses text from recommended alarm responses or procedures to identify correlated operator action events by text matching and text analytics. The technique 200 could, for example, be used for identification and correlation of operator action events that are generated or displayed at one or more operator stations 110 in the system 100 of FIG. 1. However, the technique 200 could be used with any other suitable system.

Figure 3:
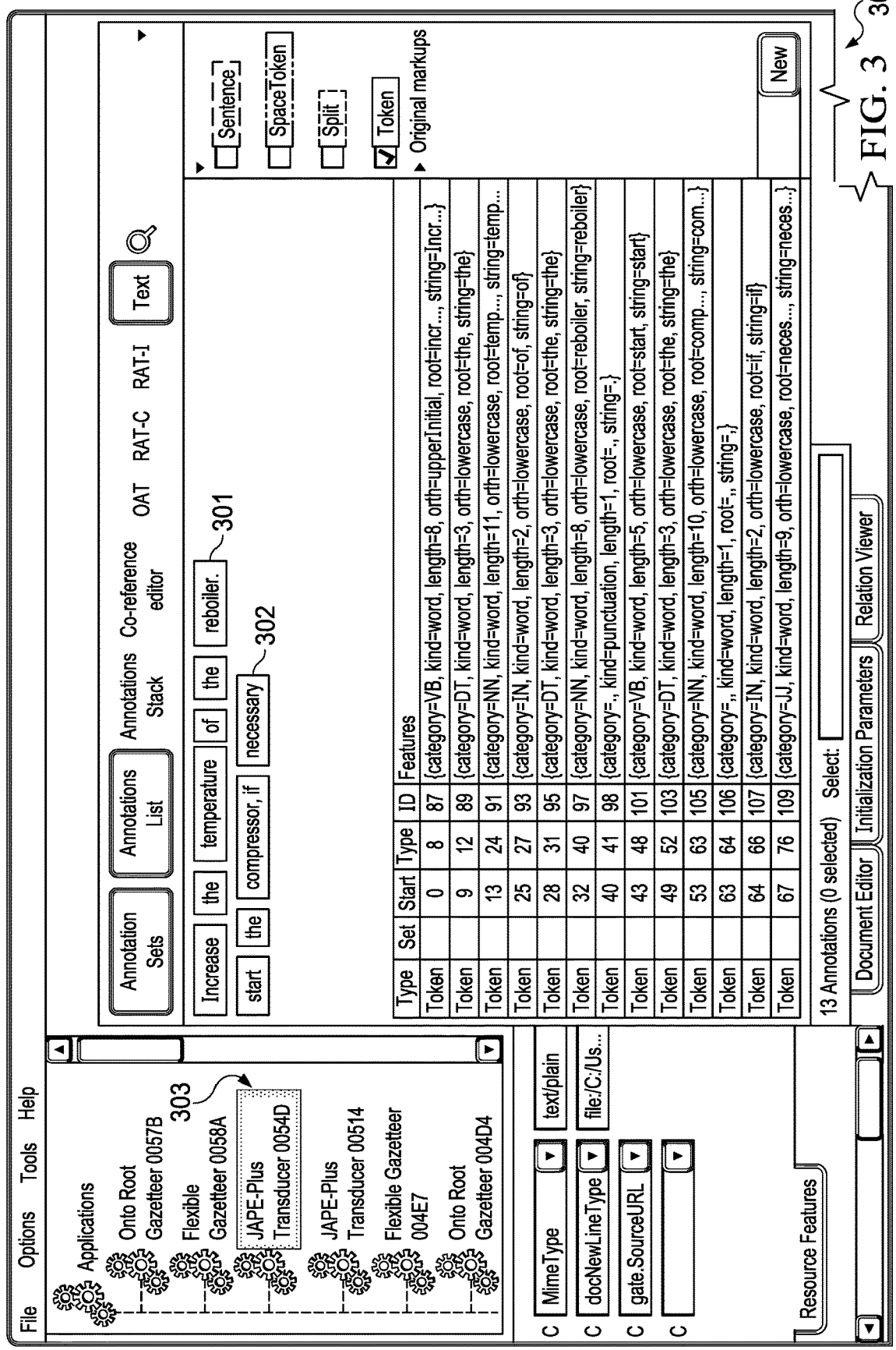
FIG. 3 illustrates a user interface that displays example text strings associated with alarms of a selected control system application according to this disclosure.

As shown in FIG. 2, the technique 200 starts with retrieval of textual input data 202a-202b from one or more input data sources. The input data 202a includes information associated with alarms that can or did occur in a process control system, such as the system 100. The input data 202a can include electronically stored operation procedures, alarm response recommendations, alarm documentation, alarm descriptions, tag descriptions, and the like. Thus, the input data 202a contains instructional text information for use in the event of a possible alarm, and also contain specific information associated with actual alarm occurrences. For example, FIG. 3 illustrates a user interface 300 that displays example text strings 301-302 associated with alarms of a selected control system application 303, according to this disclosure. The text strings 301-302 represent examples of the type of information that may be retrieved as input data 202a for the technique 200. In this example, the text string 301 ("Increase the temperature of the reboiler") and the text string 302 ("Start the compressor, if necessary") are instructions that might be displayed and followed in the event of a possible alarm.

The input data 202b includes information associated with operator responses to an alarm. That is, the input data 202b can include operator notes, operator action descriptions, and the like. In other words, the input data 202b includes text generated during an operator's response to the occurrence of an actual alarm event. As an example, one item of the input data 202b might be an operator note that states "Started Compressor #3." In addition, the input data 202b can include control system tag descriptions associated with (or resulting from) operator input.

In some embodiments, the input data 202a and the input data 202b can be retrieved from the same data storage, database, or data file, such as a process control system event log. In other embodiments, the input data 202a and the input data 202b can be retrieved from separate and distinct data sources. In either case, there are correlations between the input data 202a and the input data 202b, but such correlations are not always immediately apparent by an initial review of the data 202a-202b.

Once the input data 202a-202b is retrieved, the data is subject to text processing 204a-204b. Text processing 204a-204b is performed on the input data 202a-202b to identify key terms, called "actions" and "entities." "Actions" are associated with identified verbs, while "entities" are associated with identified nouns, proper nouns, gerunds, etc., which could potentially be equipment or entity names. Text processing 204a-204b can include tokenization, sentence splitting, part-of-speech analysis, and any other suitable text processing techniques to identify the actions and entities of the input data 202a-202b.

Figure 4:
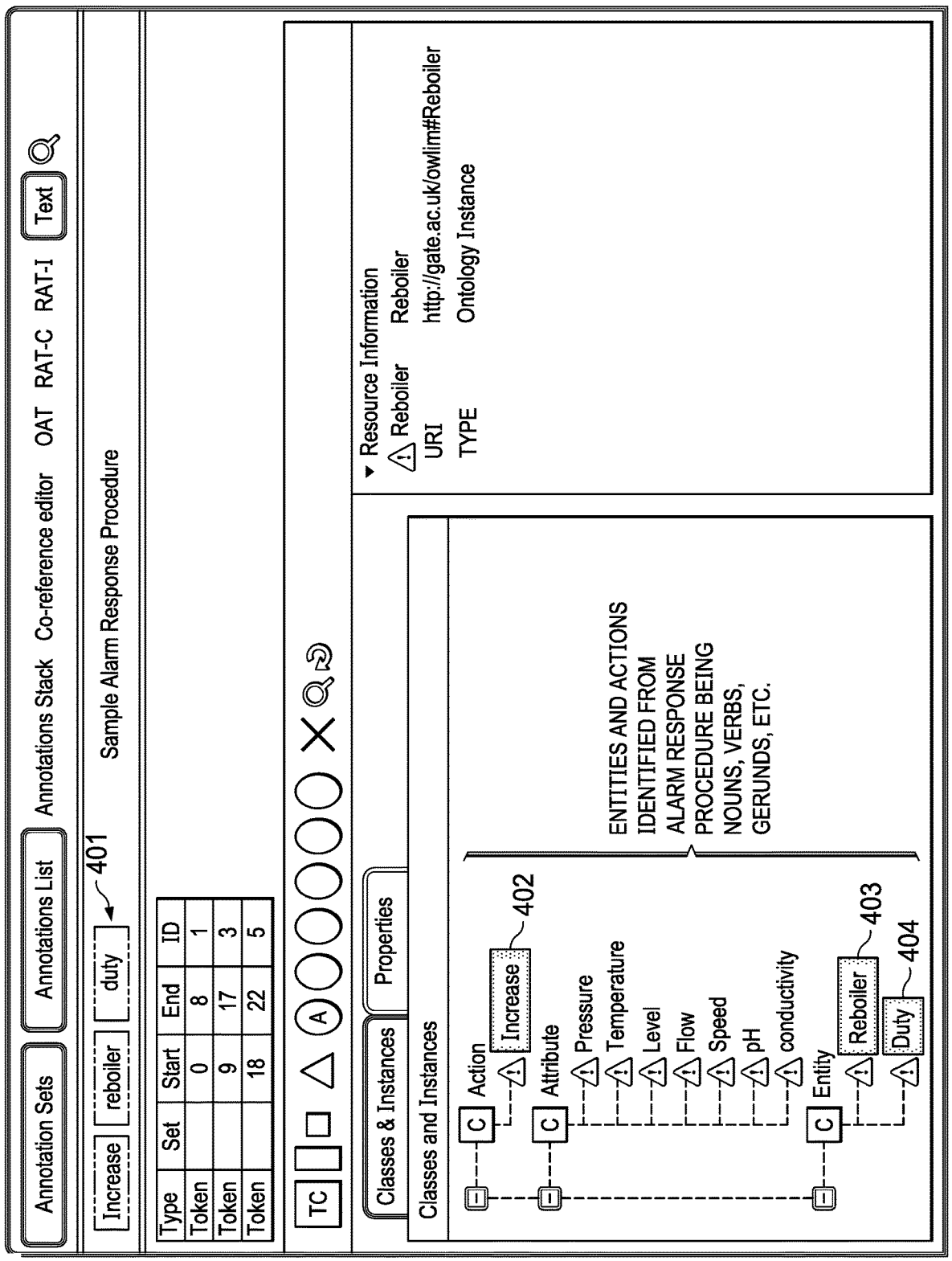
FIG. 4 illustrates a user interface that displays example results of text processing according to this disclosure.

FIG. 4 illustrates a user interface 400 that displays example results of text processing 204a-204b according to this disclosure. As shown in FIG. 4, one recommended response 401 to an alarm might be "Increase reboiler duty." By performing text processing of the alarm response 401, various actions and entities 402-404 are identified, including an action 402 "Increase" and two entities 403-404 "Reboiler" and "Duty". Once text processing 204a-204b of the input data 202a-202b occurs, the identified actions and entities are added to a list, an ontology, or the like. The entries in the list or ontology can be used as input data for later text correlation operations. While FIG. 4 illustrates a user interface 400 in which results of text processing 204a-204b is shown, it will be understood that text processing 204a-204b can be an automatic process that does not require a user interface or user input.

Once text processing 204a-204b has been performed on the input data 202a-202b, some or all of the resulting text may also undergo optional filtering operations 206a-206b and data segmentation operations 208a-208b. The filtering operations 206a-206b can include filtering out any remaining adjectives, conjunctions, prepositions, other parts of speech, or numerical data that was not removed during the text processing operations 204a-204b. Data segmentation 208a-208b involves identifying the entities (e.g., nouns, proper nouns, gerunds, etc.) that appear successively in a sentence in the procedure text and grouping them together with a unique group name. For example, "Increase reboiler duty" has two individual nouns (or entities) "reboiler" and "duty" at the conclusion of the text processing operations 204a-204b. During data segmentation 208a-208b, the two nouns are grouped together and added to the ontology as instances under a unique group or class named "Model."

Once the input data 202a-202b has undergone text processing 204a-204b and optional filtering operations 206a-206b and data segmentation operations 208a-208b, the input data 202a can be matched or correlated to the input data 202b in a text matching operation 210a-210c (collectively referred to as text matching 210).

In text matching 210, one or more words of the input data 202a are matched to one or more words of the input data 202b. The three text matching boxes 210a-210c in FIG. 2 illustrate that the text matching 210 can be performed on filtered input data or unfiltered input data. That is, because the filtering 206a-206b and the data segmentation 208a-208b are optional operations, one text matching box 210a is for matching unfiltered input data 202a and filtered input data 202b, one text matching box 210b is for matching filtered input data 202a and filtered input data 202b, and one text matching box 210c is for matching filtered input data 202a and unfiltered input data 202b. The text matching process is substantially the same for all three boxes 210a-210c, but the inputs are different for each. Depending on the embodiment, the text matching can be 1:1 (word-to-word) matching (i.e., exact matching), or based on word disambiguation (i.e., word similarity) or use of a word ontology.

Figure 5:
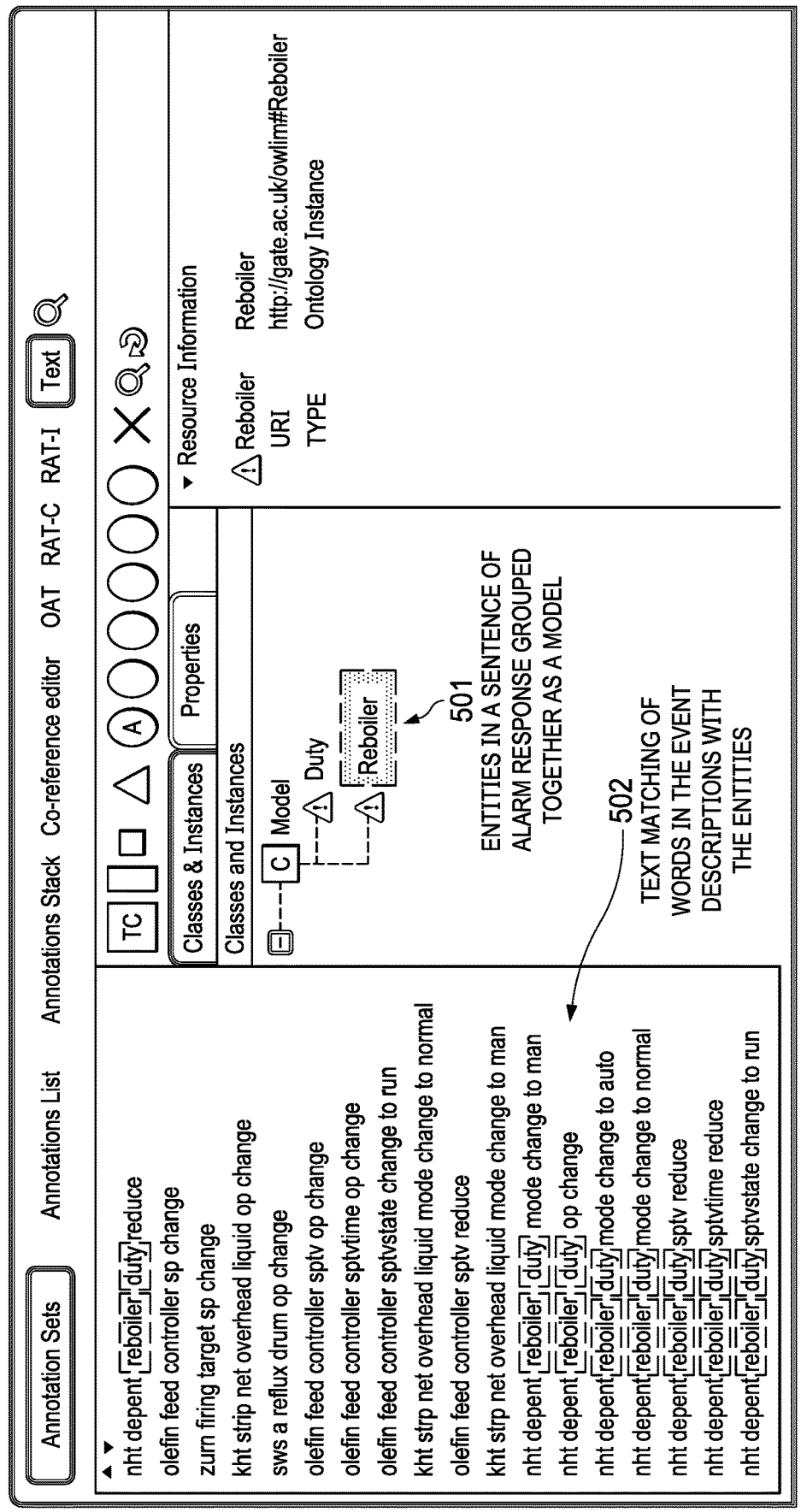
FIG. 5 illustrates a user interface that displays example results of text matching according to this disclosure.

FIG. 5 illustrates a user interface 500 that displays example results of text matching 210 according to this disclosure. As shown in FIG. 5, multiple entities 501 of an alarm response represent input data 202b of the technique 200. That is, the entities 501 "Duty" and "Reboiler" have been filtered from a recommended operator's response to an alarm, and are now being text matched with multiple phrases 502 that represent operator action event descriptions. The phrases 502 shown in FIG. 5 represent input data 202a of the technique 200. As shown in FIG. 5, several phrases 502 that include the words "reboiler" and "duty" are highlighted. These highlighted phrases 502 represent matches with the entities 501. The matched phrases 502 can then be further processed to identify unique events, as the input data 202a may contain numerous entries of the same event. The unique events are the potential correlated events for the input data 202b. As a result of the text matching 210, an alarm and its correlated operator action(s) can be identified.

Once text matching 210 is completed, the matched text can be stored in a storage 212. In some embodiments, the storage 212 is a separate storage from the event log in the data historian 114. That is, the storage 212 is a storage allocated or dedicated to alarms and their correlated (matched) operator actions. Later, after collection of many alarms and operator responses, the collected data in the storage 212 can be mined for performance metrics, operator training, regulatory compliance, and the like.

Figure 6:
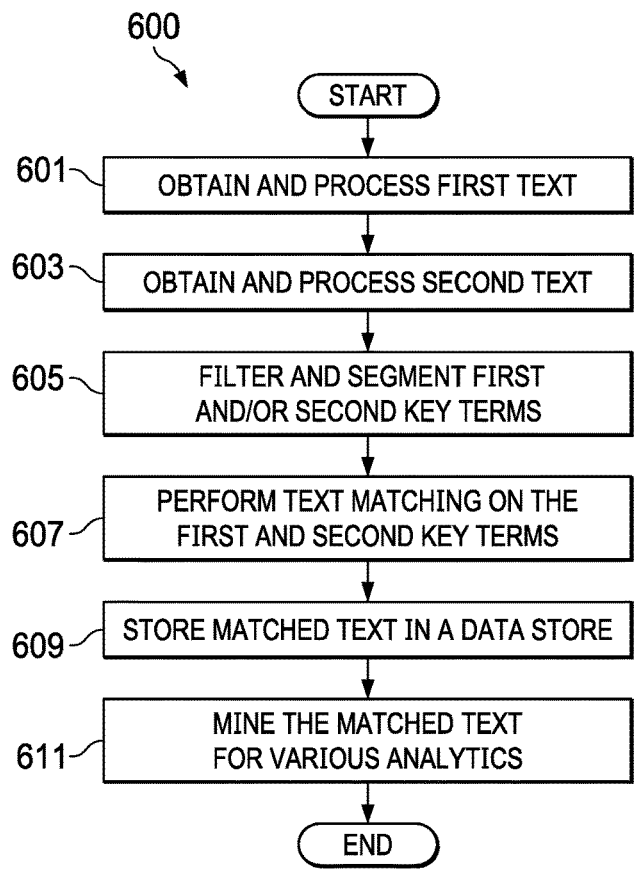
FIG. 6 illustrates an example method for identifying correlated operator action events based on text analytics of operator actions according to this disclosure.

FIG. 6 illustrates an example method 600 for identifying correlated operator action events based on text analytics of operator actions according to this disclosure. For ease of explanation, the method 600 may be described as being performed using a computing device (such as the device 700 of FIG. 7 discussed below), which could be used to implement the technique 200 of FIG. 2. However, the method 600 could be used with any suitable device or system.

At step 601, the computing device obtains, from an event log, first text of an alarm associated with an industrial process in a process control system, and processes the first text to obtain first key terms. This may include, for example, the computing device obtaining input data 202a and performing text processing 204a on the input data 202a to obtain one or more actions 402 and entities 403-404.

At step 603, the computing device obtains, from the event log, second text of an operator response, and processes the second text to obtain second key terms. This may include, for example, the computing device obtaining input data 202b and performing text processing 204b on the input data 202b to obtain one or more actions 402 and entities 403-404.

At step 605, the computing device filters and segments at least one of the first key terms and the second key terms. This may include, for example, the computing device performing filtering 206a-206b and data segmentation 208a-208b on the actions and/or entities from the input data 202a, the input data 202b, or both.

At step 607, the computing device performs text matching on the first key terms and the second key terms to identify a correlation between the first text and the second text. This may include, for example, the computing device performing text matching 210 on the actions and/or entities from the input data 202a and the input data 202b.

At step 609, the computing device stores the first text, the second text, and the correlation between the first text and the second text in a data store. This may include, for example, the computing device storing the matches from step 607 in the storage 212.

At step 611, the computing device mines the matched text stored in the data store for use in various analytics, such as generation of performance metrics, operator training, regulatory compliance, and the like.

Although FIG. 6 illustrates one example of a method 600 for identifying correlated operator action events based on text analytics of operator actions, various changes may be made to FIG. 6. For example, while shown as a series of steps, various steps shown in FIG. 6 could overlap, occur in parallel, occur in a different order, or occur multiple times. Moreover, some steps could be combined or removed and additional steps could be added according to particular needs.

Figure 7:
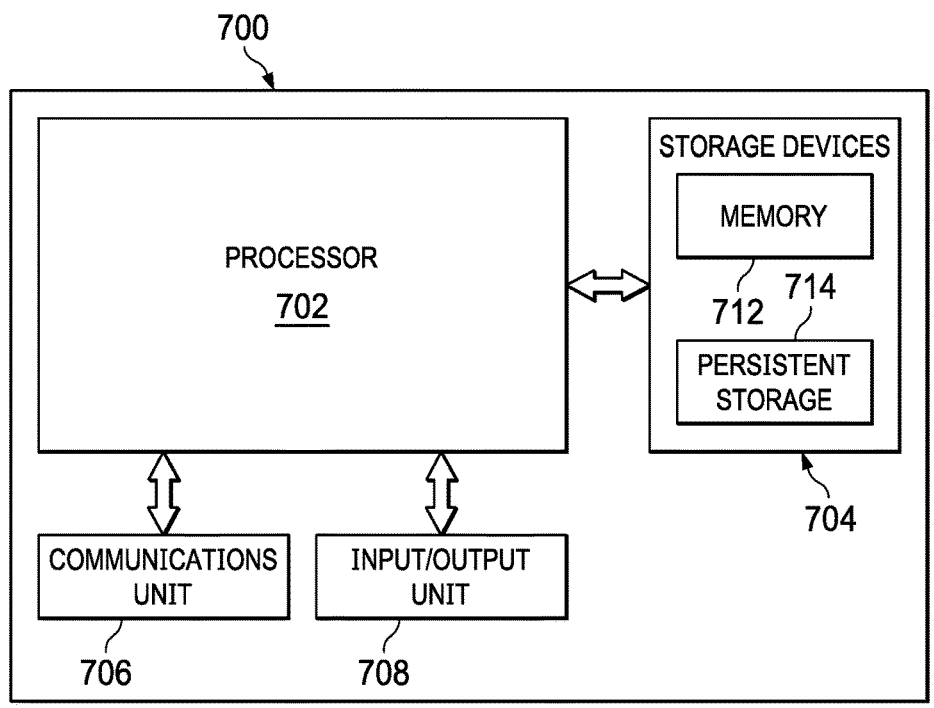
FIG. 7 illustrates an example device supporting identification of correlated operator action events based on text analytics of operator actions according to this disclosure.

FIG. 7 illustrates an example device 700 supporting identification of correlated operator action events based on text analytics of operator actions according to this disclosure. The device 700 could, for example, represent the operator stations 110, the historian 114, or the server 116 of FIG. 1. However, these components could be implemented using any other suitable device or system, and the device 700 could be used in any other suitable system.

As shown in FIG. 7, the device 700 includes at least one processor 702, at least one storage device 704, at least one communications unit 706, and at least one input/output (I/O) unit 708. Each processor 702 can execute instructions, such as those implementing the techniques described above that may be loaded into a memory 712. Each processor 702 denotes any suitable processing device, such as one or more microprocessors, microcontrollers, digital signal processors, application specific integrated circuits (ASICs), field programmable gate arrays (FPGAs), or discrete circuitry.

The memory 712 and a persistent storage 714 are examples of storage devices 704, which represent any structure(s) capable of storing and facilitating retrieval of information (such as data, program code, and/or other suitable information on a temporary or permanent basis). The memory 712 may represent a random access memory or any other suitable volatile or non-volatile storage device(s). The persistent storage 714 may contain one or more components or devices supporting longer-term storage of data, such as a read only memory, hard drive, Flash memory, or optical disc. The memory 712 or the persistent storage 714 may be configured to store information and data associated with identification of correlated operator action events based on text analytics of operator actions.

The communications unit 706 supports communications with other systems or devices. For example, the communications unit 706 could include a network interface card or a wireless transceiver facilitating communications over a wired or wireless network (such as the network 108). The communications unit 706 may support communications through any suitable physical or wireless communication link(s).

The I/O unit 708 allows for input and output of data. For example, the I/O unit 708 may provide a connection for user input through a keyboard, mouse, keypad, touchscreen, or other suitable input device. The I/O unit 708 may also send output to a display, printer, or other suitable output device.

Although FIG. 7 illustrates one example of a device 700 supporting identification of correlated operator action events based on text analytics of operator actions, various changes may be made to FIG. 7. For example, various components in FIG. 7 could be combined, further subdivided, or omitted and additional components could be added according to particular needs. Also, computing devices can come in a wide variety of configurations, and FIG. 7 does not limit this disclosure to any particular configuration of computing device.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   obtaining, from an event log, a first text of an alarm associated with an industrial process in a process control system, and processing the first text to obtain first key terms;
   obtaining, from the event log, a second text of an operator response, and processing the second text to obtain second key terms;
   filtering and segmenting at least one of the first key terms and the second key terms, wherein the filtering and segmenting further comprises data segmentation involving identifying entities that appear successively in a sentence in the first text and the second text and grouping the entities with a unique group name;
   performing text matching on the first key terms and the second key terms, to identify a correlation between the first text and the second text and to identify correlated operator action events based on text analytics of the event log; and
   storing the first text, the second text, and the correlation between the first text and the second text in a data store, wherein the first text comprises at least one of an operation procedure, an operator log, and an operator comment.

2. The method of claim 1, wherein the event log is populated with events, alarms, and operator responses associated with the industrial process over time.

3. The method of claim 1, wherein filtering and segmenting at least one of the first key terms and the second key terms comprises filtering and segmenting both the first key terms and the second key terms.

4. The method of claim 1, wherein the first text comprises at least one of an alarm response recommendation, an alarm description, an event description, and an alarm documentation.

5. The method of claim 1, wherein the text matching comprises at least one of exact word matching or word similarity matching.

6. The method of claim 1, wherein the processing of the first and second text comprises at least one of tokenization, sentence splitting, and part-of-speech analysis.

7. The method of claim 1, further comprising:
   mining the stored text in the data store for use in at least one of: generation of performance metrics, operator training, and regulatory compliance.

8. An apparatus, comprising:
   at least one processing device configured to:
   obtain, from an event log, a first text of an alarm associated with an industrial process in a process control system, and process the first text to obtain first key terms;
   obtain, from the event log, a second text of an operator response, and process the second text to obtain second key terms;

filter and segment at least one of the first key terms and the second key terms, wherein the filter and the segment of the at least one of the first key terms and the second key terms, further comprises data segmentation involving identifying entities that appear successively in a sentence in the first text and the second text and grouping the entities with a unique group name;

perform text matching on the first key terms and the second key terms, to identify a correlation between the first text and the second text and to identify correlated operator action events based on text analytics of the event log; and store the first text, the second text, and the correlation between the first text and the second text in a data store, wherein the first text comprises at least one of an operation procedure, an operator log, and an operator comment.

9. The apparatus of claim 8, wherein the event log is populated with events, alarms, and operator responses associated with the industrial process over time.

10. The apparatus of claim 8, wherein to filter and segment the at least one of the first key terms and the second key terms, the at least one processing device is configured to filter and segment both the first key terms and the second key terms.

11. The apparatus of claim 8, wherein the first text comprises at least one of an alarm response recommendation, an alarm description, an event description, and an alarm documentation.

12. The apparatus of claim 8, wherein the text matching comprises at least one of exact word matching or word similarity matching.

13. The apparatus of claim 8, wherein to process the first and second text, the at least one processing device is configured to perform at least one of tokenization, sentence splitting, and part-of-speech analysis.

14. The apparatus of claim 8, wherein the at least one processing device is further configured to:
  mine the stored text in the data store for use in at least one of: generation of performance metrics, operator training, and regulatory compliance.

15. A non-transitory computer readable medium containing instructions that when executed cause at least one processing device to:
  obtain, from an event log, a first text of an alarm associated with an industrial process in a process control system, and process the first text to obtain first key terms;
  obtain, from the event log, a second text of an operator response, and process the second text to obtain second key terms;
  filter and segment at least one of the first key terms and the second key terms, wherein the instructions to filter and segment the at least one of the first key terms and the second key terms further comprises instructions for data segmentation involving identifying entities that appear successively in a sentence in the first text and the second text and grouping the entities with a unique group name;
  perform text matching on the first key terms and the second key terms, to identify a correlation between the first text and the second text and to identify correlated operator action events based on text analytics of the event log; and
  store the first text, the second text, and the correlation between the first text and the second text in a data store, wherein the first text comprises at least one of an operation procedure, an operator log, and an operator comment.

16. The non-transitory computer readable medium of claim 15, wherein the event log is populated with events, alarms, and operator responses associated with the industrial process over time.

17. The non-transitory computer readable medium of claim 15, wherein the instructions to filter and segment the at least one of the first key terms and the second key terms comprise instructions to filter and segment both the first key terms and the second key terms.

* * * * *